United States Patent
Madawala

(10) Patent No.: US 8,432,051 B2
(45) Date of Patent: Apr. 30, 2013

(54) ELECTRIC GENERATOR

(75) Inventor: Udaya Madawala, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 672 days.

(21) Appl. No.: 12/670,542

(22) PCT Filed: Jul. 25, 2008

(86) PCT No.: PCT/NZ2008/000182
§ 371 (c)(1),
(2), (4) Date: Apr. 19, 2010

(87) PCT Pub. No.: WO2009/014459
PCT Pub. Date: Jan. 29, 2009

(65) Prior Publication Data
US 2010/0207479 A1    Aug. 19, 2010

(30) Foreign Application Priority Data
Jul. 26, 2007  (NZ) ....................... 556760

(51) Int. Cl.
*H02P 9/44* (2006.01)
*F03D 9/00* (2006.01)
(52) U.S. Cl.
USPC ............................................. 290/44; 322/29
(58) Field of Classification Search ............... 290/43, 290/44; 322/22, 25, 29
See application file for complete search history.

(56) References Cited

U.S. PATENT DOCUMENTS

| | | | |
|---|---|---|---|
| 4,503,377 A | 3/1985 | Kitabayashi et al. | |
| 5,418,446 A * | 5/1995 | Hallidy | 322/28 |
| 5,729,118 A | 3/1998 | Yanagisawa et al. | |
| 5,764,036 A * | 6/1998 | Vaidya et al. | 322/90 |
| 6,072,303 A * | 6/2000 | Nickoladze et al. | 322/20 |
| 6,462,429 B1 | 10/2002 | Dhyanchand et al. | |
| 7,064,455 B2 * | 6/2006 | Lando | 290/1 C |
| 7,288,923 B1 * | 10/2007 | Dooley et al. | 322/89 |
| 7,514,806 B2 * | 4/2009 | Xu et al. | 290/31 |
| 8,148,834 B2 * | 4/2012 | Huang et al. | 290/31 |
| 2002/0047455 A1 | 4/2002 | Dhyanchand et al. | |

FOREIGN PATENT DOCUMENTS

| | | |
|---|---|---|
| CN | 101001036 | 7/2007 |
| CN | 101202489 | 6/2008 |
| JP | 60184000 | 9/1985 |
| NZ | PCT/2008/000182 | 7/2008 |
| WO | 2009014459 A1 | 1/2009 |

\* cited by examiner

*Primary Examiner* — Nicholas Ponomarenko
(74) *Attorney, Agent, or Firm* — Hickman Palermo Truong Becker Bingham Wong LLP

(57) ABSTRACT

An electric power generator for generating a substantially constant frequency output from a varying mechanical speed input such as from a wind or water turbine, comprises a three-phase induction machine in which at least one stator winding is magnetically and electrically decoupled from at least one other stator winding which is arranged to be connected to an external load, and a power source is arranged to excite said at least one stator winding with an AC current at a desired output frequency. The power generator can be directly connected to the mains grid without requiring a power electronics rectifier and inverter stage to convert the generator output to constant frequency AC.

19 Claims, 8 Drawing Sheets

ELECTRIC GENERATOR

FIELD OF THE INVENTION

The invention generally relates to electric power generation and particularly to generating power using an induction machine where the mechanical input speed may vary, such as in a wind or hydro driven generator, to provide a constant frequency electrical output.

BACKGROUND OF THE INVENTION

In general in an induction machine used as a generator, the frequency of the alternating electrical current generated varies with rotor speed. In applications where the speed at which the rotor is driven can vary, such as with varying wind speed in a wind power generator or turbine, or where power is generated from a varying speed water flow, the output power frequency will vary unless this is addressed in the generator or turbine design.

The use of small generators (sometimes called micro-turbines) driven by wind or hydro power is increasing, for power generation at a domestic or small agricultural or industrial scale for example, but uptake is subject to factors including the initial installation cost to the home or small enterprise.

A household or small enterprise utilising local scale power generation often has the option of feeding excess power back into the main electric power distribution grid. Power fed into the grid must be at mains frequency.

AC voltage with variable frequency can be rectified to DC and then inverted back to constant frequency AC voltage to produce AC power. This however requires an additional power electronics stage at the output of a generator, which increases complexity and/or cost. Alternatively a constant speed mechanical drive can be used but at the expense of not being able to extract maximum possible energy that is available. Alternatively again a doubly fed induction machine can be used. An exciting frequency which varies with rotor speed is fed to the rotor in such a way that a constant frequency of AC is output by the machine. This also requires more sophisticated electronics, for providing the varying frequency current to the rotor.

SUMMARY OF INVENTION

It is an object of the invention to provide an improved or at least alternative AC electric generator. Particularly, the invention provides an electric power generator suitable for smaller scale, local power generation, which can provide a constant frequency output with a varying mechanical input drive speed to the generator. Typically the generator can be implemented utilising a relatively low cost standard design three phase squirrel cage induction machine.

In broad terms in one aspect the invention comprises an electric power generator for generating a substantially constant frequency output from a varying mechanical speed input, comprising a three-phase induction machine with a rotor and a stator, the stator comprising three windings, in which a first winding is magnetically and electrically decoupled from second and third windings, the second and third windings are connected in series to be connected to an external load, and a power source is arranged to excite the first stator winding with an AC current at a desired output frequency.

In this first aspect of the invention, preferably in one form the exciting power source for the first stator winding comprises an AC inverter arranged to convert DC from a battery or capacitor bank to AC at the output frequency.

In this first aspect of the invention, preferably in one form the exciting power source for the first stator winding comprises a rectifier and battery or capacitor bank arranged to convert an alternating current from the generator to DC for recharging the battery or capacitor bank.

In this first aspect of the invention, preferably in another form the exciting power source for the first stator winding comprises a rectifier-inverter arranged for bi-directional power flow between a battery or capacitor bank and the first stator winding for both exciting the first stator winding at the output frequency and recharging the battery or capacitor bank.

In broad terms in a second aspect the invention comprises an electric power generator for generating a substantially constant frequency output from a varying mechanical speed input, comprising a three-phase induction machine with a rotor and a stator, the stator comprising three windings, in which first and second windings are magnetically and electrically decoupled from the third winding, the third winding to be connected to an external load, and a power source is arranged to excite the first and second stator windings with an AC current at a desired output frequency.

In this second aspect of the invention, preferably in one form the exciting power source for the first and second stator windings comprises an AC inverter arranged to convert DC from a battery or capacitor bank to AC at the output frequency.

In this second aspect of the invention, preferably in one form the exciting power source for the first and second stator windings comprises a rectifier and battery or capacitor bank arranged to convert an alternating current from the generator to DC for recharging the battery or capacitor bank.

In this second aspect of the invention, preferably in another form the exciting power source for the first and second stator windings comprises a rectifier-inverter arranged for bi-directional power flow between a battery or capacitor bank and the first stator winding for both exciting the first stator winding at the output frequency and recharging the battery or capacitor bank.

In both aspects of the invention, preferably the rotor is a squirrel cage rotor.

In both aspects of the invention, preferably in one form, the generator is part of a wind turbine.

In both aspects of the invention, preferably in another form, the generator is part of a hydro turbine.

In broad terms in a further aspect the invention comprises a method of generating electric power of substantially constant frequency single phase output from a varying mechanical speed input, comprising rotating with a varying speed the rotor of a three-phase induction machine while exciting at least a first stator winding, which is magnetically and electrically decoupled from at least one other stator winding, with an AC current at a desired output frequency, and taking power from at least said one other stator winding.

In broad terms in a further aspect the invention comprises an electric power generator for generating a substantially constant frequency three phase output from a varying mechanical speed input, comprising three stators or sets of stator windings of three three-phase cage induction motors, each comprising three stator windings, in which at least one winding of each stator or set of stator windings is magnetically and electrically decoupled from at least one other winding and in which in each stator at least one other winding is arranged to be connected to an external load, and a power source or sources is or are arranged to excite said at least one winding of a first of said stators or sets of stator windings with an AC current at a desired output frequency and with a first phase, said at least one winding of a second stator or sets of stator windings with an AC current at said desired output frequency and with a second phase, and said at least one winding of the third of said stators or sets of stator windings with an AC current at said desired output frequency and with a third phase.

In one form one winding of each stator is magnetically and electrically decoupled from two other windings of the stator or set of stator windings which are connected in series and arranged to be connected to an external load, and said power source or sources is or are arranged to excite said one winding of a first stator or set of stator windings with an AC current at a desired output frequency and with a first phase, said one winding of a second stator or set of stator windings with an AC current at said desired output frequency and with a second phase, and said one winding of the third of said stators or set of stator windings with an AC current at said desired output frequency and with a third phase.

In another form two windings of each stator or set of stator windings are magnetically and electrically decoupled from a third winding of the stator which is arranged to be connected to an external load, and said power source or sources is or are arranged to excite said two windings of a first stator or set of stator windings with an AC current at a desired output frequency and with a first phase, said two windings of a second stator or set of stator windings with an AC current at said desired output frequency and with a second phase, and said two windings of the third of said stators or set of stator windings with an AC current at said desired output frequency and with a third phase.

In broad terms in a further aspect the invention comprises a method of generating three phase electric power of substantially constant frequency output from a varying mechanical speed input, comprising rotating with a varying speed the rotor(s) of a three-phase induction machine comprising three stators or three sets of stator windings, while exciting at least a first winding of a first stator or set of stator windings with an AC current at a desired output frequency and with a first phase, and taking a first output power phase from at least one other stator winding of said first stator or set of stator windings, said first winding of said first stator or set of stator windings being magnetically and electrically decoupled from said at least one other winding, exciting at least a first winding of a second stator or set of stator windings with an AC current at a desired output frequency and with a second phase while taking a second output power phase from at least one other stator winding of said second stator or set of stator windings, said first winding of said second stator or set of stator windings being magnetically and electrically decoupled from said at least one other winding, and exciting at least a first winding of a third stator or set of stator windings with an AC current at a desired output frequency and with a third phase while taking a third output power phase from at least one other stator winding of said third stator or set of stator windings, said first winding of said third stator or set of stator windings being magnetically and electrically decoupled from said at least one other winding.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

BRIEF DESCRIPTION OF THE DRAWINGS

Preferred embodiments of the invention are described with reference to the accompanying drawings, by way of example in which.

DETAILED DESCRIPTION OF PREFERRED FORMS

Figure 1:
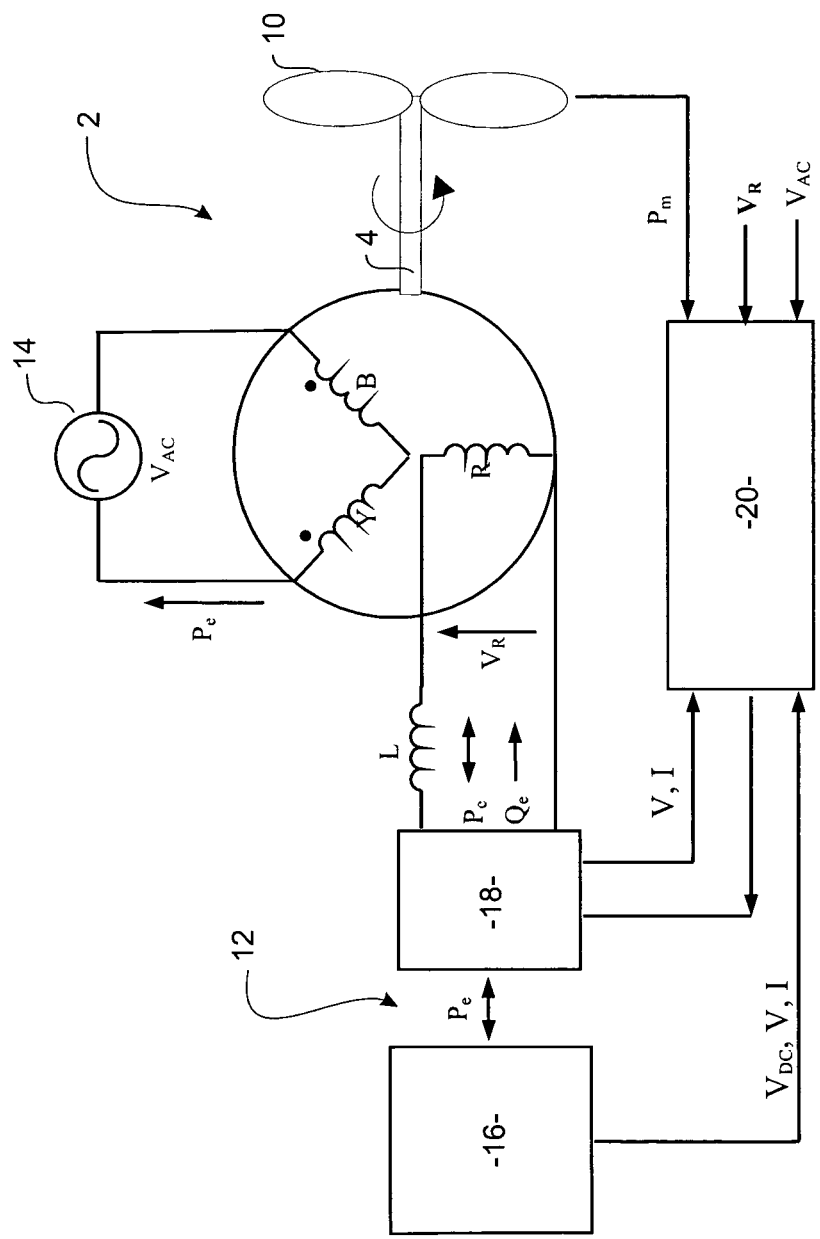
FIG. 1 schematically illustrates a first preferred embodiment of the invention for generation of single phase power.

Referring first to FIG. 1, a three-phase induction machine 2 comprises three stator windings R, Y and B. The rotor of the machine is mechanically connected to be driven by a turbine 10 as shown, which may be a wind turbine or a hydro turbine, or drive system which may cause varying speed mechanical rotation. For example the speed of a wind or water turbine can vary with varying wind speed or water flow rate. The machine 2 generates single phase power of constant frequency from a varying speed mechanical drive. It is not necessary to provide a mechanical system between the wind turbine rotor or hydro turbine impeller for reducing the input speed drive to the rotor to a constant speed in normal operation (except that optionally a clutch system or similar for preventing mechanical damage at extreme wind speeds for example may be provided). In the event that the variable mechanical speed is of low speed, a gear box may be employed to produce a varying higher speed.

One stator winding R is connected to a power source 12 for exciting this stator winding as will be further described. The second and third stator windings Y and B are connected in series and to load 14, to provide single phase alternating power $V_{AC}$. The output $V_{AC}$ of the machine may be connected directly to the mains grid, without requiring a rectifier-inverter (and commonly a filter) stage between the generator and the grid.

Stator winding R is excited with an AC voltage $V_R$ and current at the desired generator output frequency. For example if it is desired that the output frequency of the generator is 50 Hz then winding R is excited with a 50 Hz signal. In the embodiment of FIG. 1 the exciting current to stator winding R is provided from a battery or capacitor bank 16 via a reversible inverter-rectifier 18 as shown, which converts DC power from the battery or capacitor bank 16 to AC at the desired output frequency. In addition in this form, if necessary the AC power generated by rotor rotation can also be extracted, through the stator winding R and reversible inverter-rectifier 18, to recharge the battery or capacitor bank 16.

A controller 20 is provided to supply switching signals to the reversible inverter-rectifier 18 to invert the DC current from the battery or capacitor bank 16 to the AC signal $V_R$ to be supplied to stator winding R. Alternatively, as shown the controller 20 may receive signals indicative of any one or more of the DC voltage of the battery or capacitor bank 16, the speed of and power generated by the mechanical input drive 4, the voltage across the excited stator winding R, and the AC voltage supplied to the load 14 as indicated by $V_{DC}$, $P_M$, V, I, $V_R$, and $V_{AC}$ respectively, and may provide switching signals to the reversible inverter-rectifier 18 based on this input information. The controller 20 may be powered by any one or more of the DC voltage of the battery or capacitor bank 16, the voltage across the excited stator winding R and the AC voltage supplied to the load 14. The controller 20 may be implemented in hardware or software or both.

Power flow between the battery or capacitor bank 16 and rectifier 18 is indicated as Pe and between the rectifier 18 and winding R as Pe and Qe.

Figure 2:
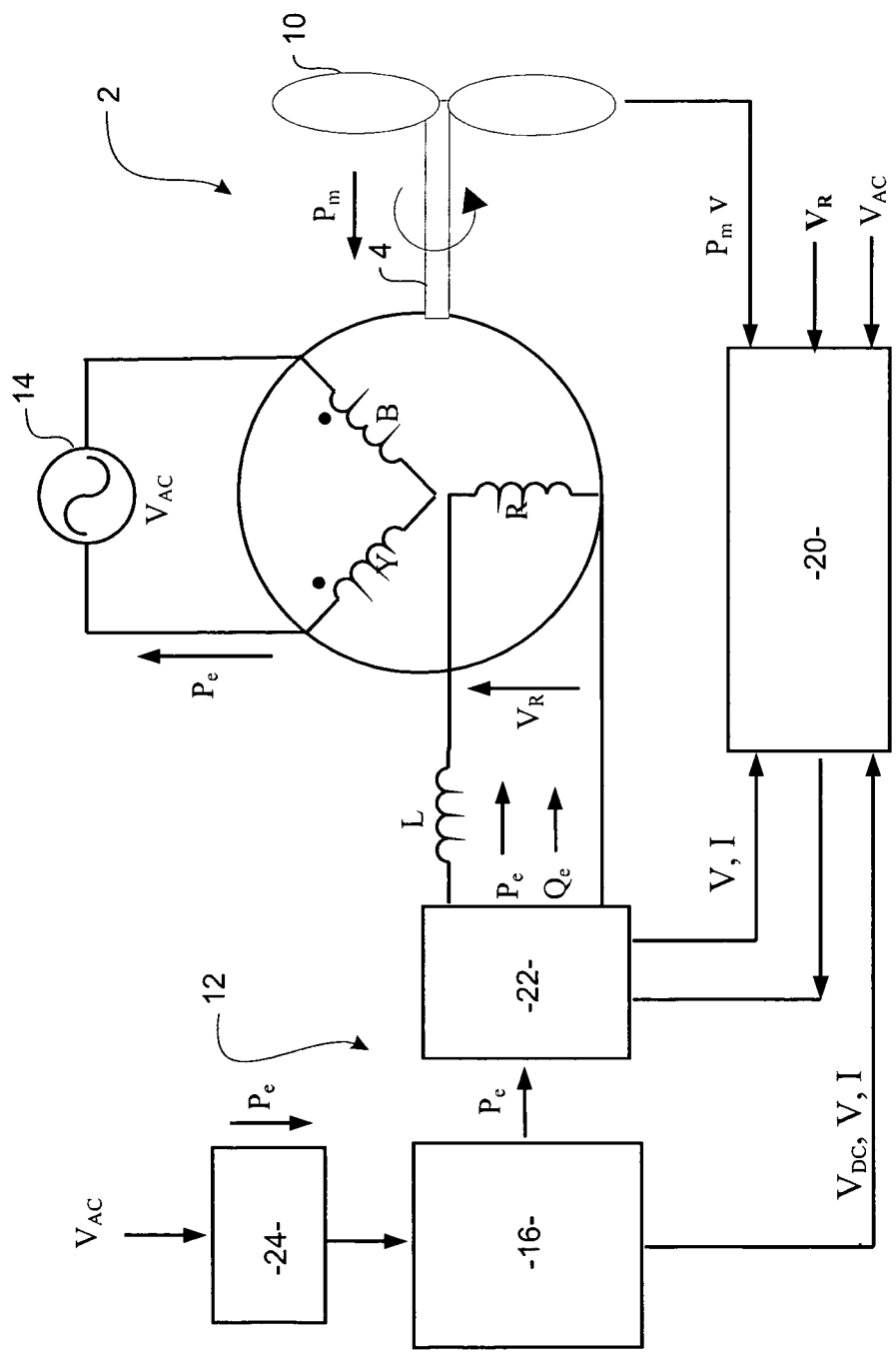
FIG. 2 schematically illustrates a second preferred embodiment of the invention for generation of single phase power.

An alternative embodiment is shown in FIG. 2. In this embodiment an inverter 22 is provided between the battery or capacitor bank 16 and the stator winding R which is excited with constant frequency signal $V_R$. The battery or capacitor bank 16 supplies DC current to the inverter 22 which inverts the current to AC signal $V_R$ for excitation of the stator winding R. The controller 20 supplies switching signals to the inverter 22. The inverter 22 may be a single phase inverter. Also provided is a rectifier 24 for recharging the battery or capacitor bank 16. The rectifier is supplied with AC current from the second and third stator windings Y and B and rectifies it to DC current. Preferably the rectifier 24 is a single phase rectifier. Unless otherwise indicated, the same reference numbers, voltage, current, power flow and signal arrows in this and subsequently described embodiments indicate the same as in FIG. 1.

Figure 3:
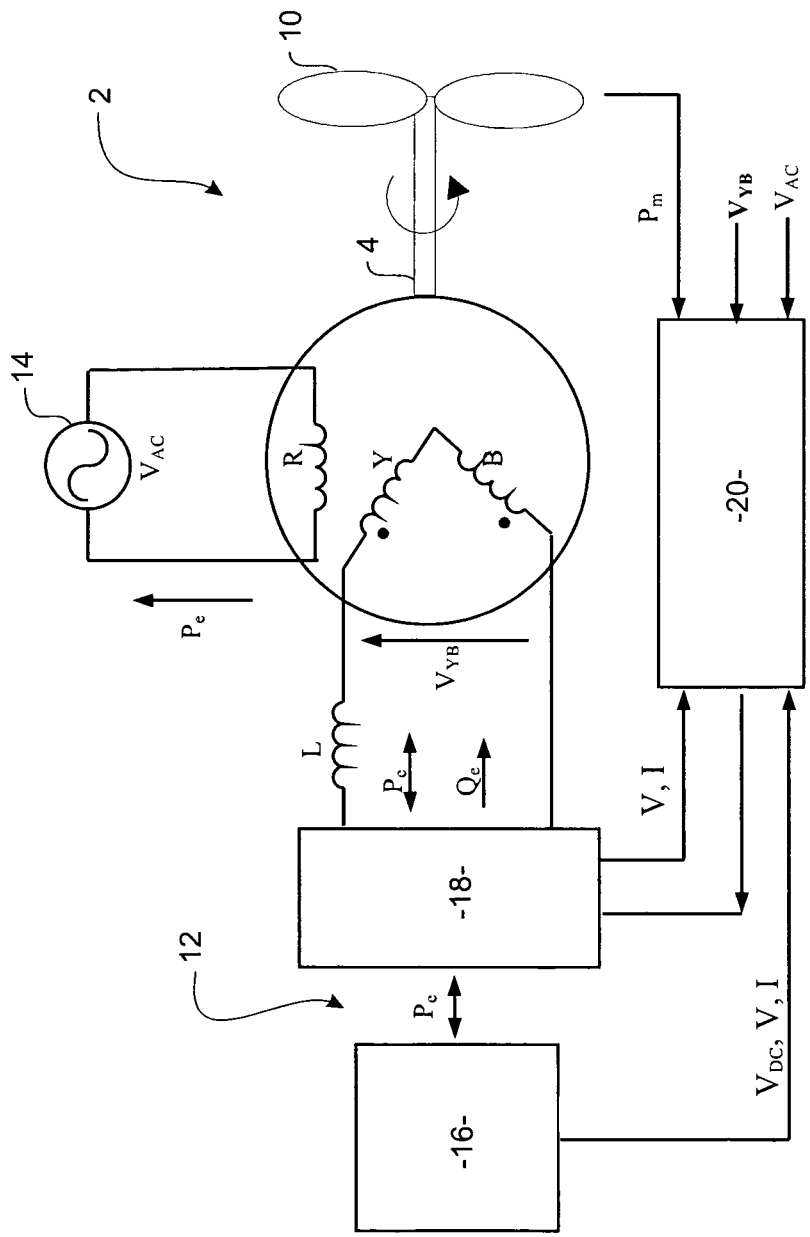
FIG. 3 schematically illustrates a third preferred embodiment of the invention for generation of single phase power.

A further alternative embodiment is shown in FIG. 3. In this embodiment two stator windings Y and B are excited with an AC voltage $V_{YB}$ (equivalent to $V_R$ in FIGS. 1 and 2) and current at the desired output frequency. The other stator winding R is connected to the load to supply single phase alternating current power. In this embodiment like the embodiment of FIG. 1, the battery or capacitor bank 16 is recharged by a reversible inverter-rectifier 18. If necessary, AC power generated can also be extracted through the excited stator windings Y and B, and is rectified to DC by the reversible inverter-rectifier to recharge the battery or capacitor bank 16 as previously described.

Figure 4:
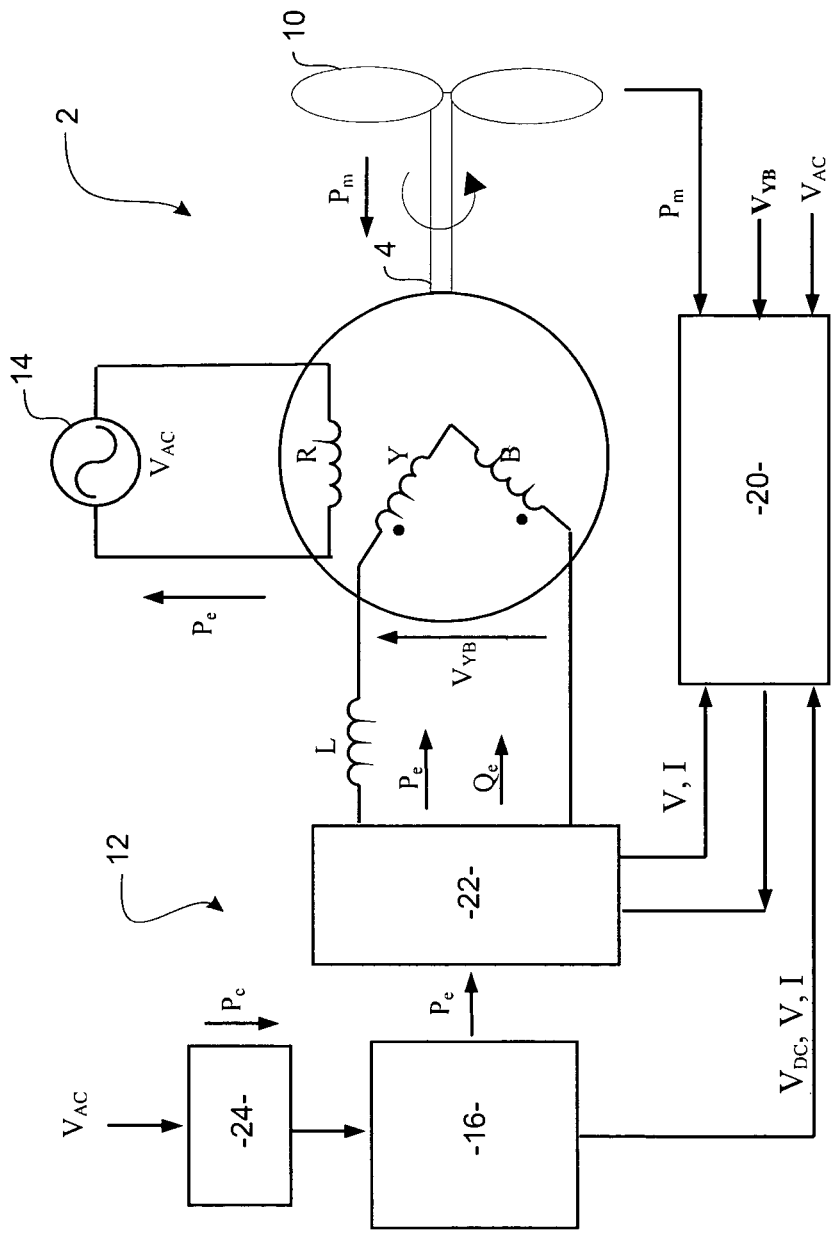
FIG. 4 schematically illustrates a fourth preferred embodiment of the invention for generation of single phase power.

A further alternative embodiment is shown in FIG. 4 wherein again two stator windings Y and B are excited as in FIG. 3 by signal $V_{YB}$ at the output frequency and winding R supplies the load. In this embodiment like the embodiment of FIG. 2 an inverter 22 is used to supply AC current to the stator and a rectifier 24 is used to supply DC current to recharge the battery or capacitor bank 16 as in FIG. 2.

The generator may be implemented utilising a standard and relatively low cost three phase squirrel cage induction machine, by simply connecting one of the phases as the exciting phase R and the other two phases in series to the load as phases Y and B, or alternatively, by connecting two of the phases as the exciting phases Y and B and the other phase in series to the load as phase R. Typically the generator will be lower cost than either a single phase induction machine with a split winding or a 3-phase doubly-fed (wound rotor) induction machine.

Figure 5:
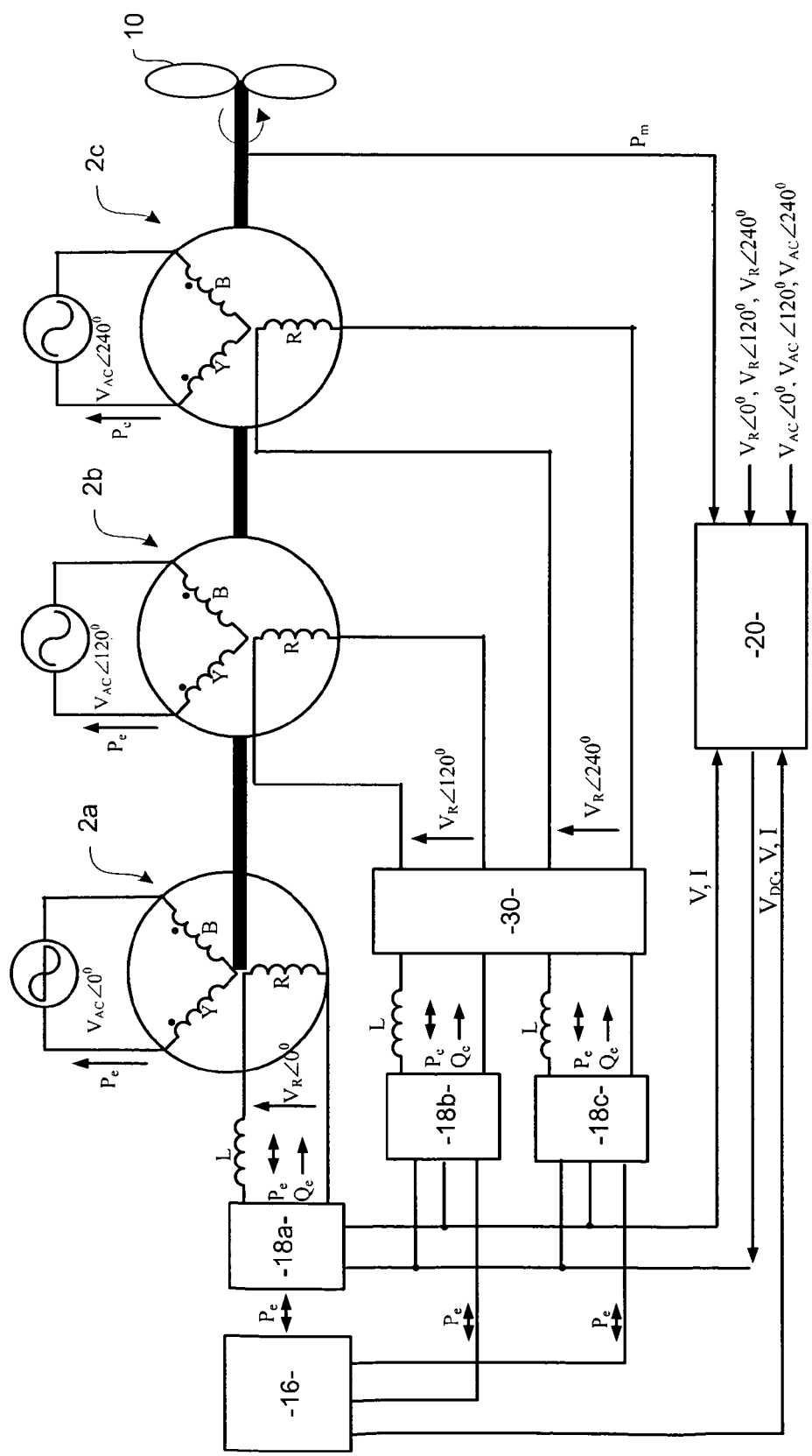
FIG. 5 schematically illustrates a fifth preferred embodiment of the invention for generation of three phase power.

FIG. 5 shows an embodiment for generation of three phase power which may be implemented using three such standard three phase squirrel cage induction machines for example, and by connecting the output of each of the three machines to the load in parallel. The machines 2a, 2b and 2c may be physically positioned in line, with the input drive shaft from a wind or hydro turbine for example mechanically coupled to the rotor drive shaft of the first machine on one side, the end of the rotor shaft of the first machine on the other side of the first machine mechanically coupled to the input side of the rotor drive shaft of the second machine, and with the other end of the shaft of the second machine on the other side of the second machine mechanically coupled to the input end of the rotor drive shaft of the third machine, so that all machines are driven at the same speed. Alternatively the three machines may be arranged in any other configuration and with their input shafts coupled together by any system of drive gears or belts for similar. One stator winding R of one machine 2a is connected to single phase reversible rectifier 18a, which converts DC power from battery or capacitor bank 16 to AC signal $V_R$ at the desired output frequency. Stator winding R of machine 2b and stator winding R of machine 2c are connected through a phase shift and phase lock loop block 30 also to single phase reversible rectifiers 18b and 18c respectively, both of which are also powered from battery or capacitor bank 16. The phase shift and phase lock loop stage 30 shifts the phase of the exciting voltage $V_R$ and current supplied to winding R of machine 2a so that it is 120 degrees out of phase with the exciting voltage and current $V_R$ supplied to the winding R of machine 2a, and the exiting voltage $V_R$ and current supplied to winding R of machine 2C so that it is 240 degrees out of phase with the exiting voltage $V_R$ and current supplied to the winding R of machine 2a. The second and third stator windings Y and B in series of each of machines 2a, 2b and 2c are connected in parallel to a common load 14, to provide three phase alternating power $V_{AC}$, of constant frequency (for varying mechanical input drive speed). Controller 20 supplies switching signals to the reversible inverter-rectifiers 18a-c. Alternatively as shown the controller 20 may receive signals indicative of any one of the DC voltage of the battery or capacitor bank 16, the speed of and power generated by the mechanical input drive, the voltage across each of the excited stator windings R, and the AC voltage supplied by the output of each of machines 2a to 2c to the load, and may provide switching signals to the reversible inverter-rectifiers 18a-c based on this input information.

Figure 6:
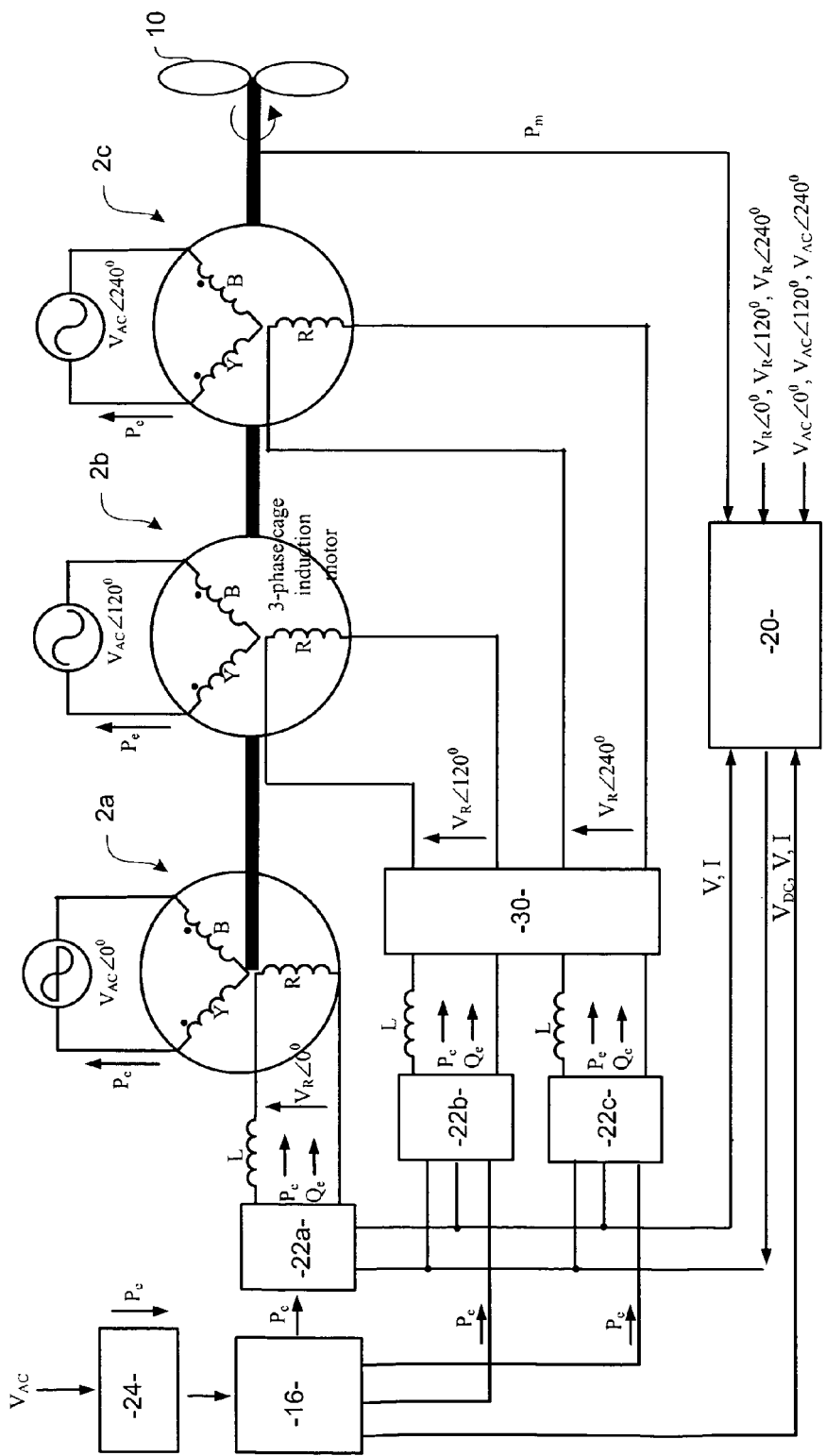
FIG. 6 schematically illustrates a sixth preferred embodiment of the invention, for generation of three phase power.

FIG. 6 shows an alternative three phase embodiment which also utilises three machines 2a-2c with phase shift and phase lock loop stage 30 for energising stator winding R of each machine in three different phases as in the embodiment of FIG. 5, but in which reversible rectifiers 18a-c are replaced with single phase inverters 22a-c powered from the battery or capacitor bank 16. Three phase rectifier 24 supplied AC current from the output of each of the three machines 2a-2c maintains battery or capacitor charge.

Figure 7:
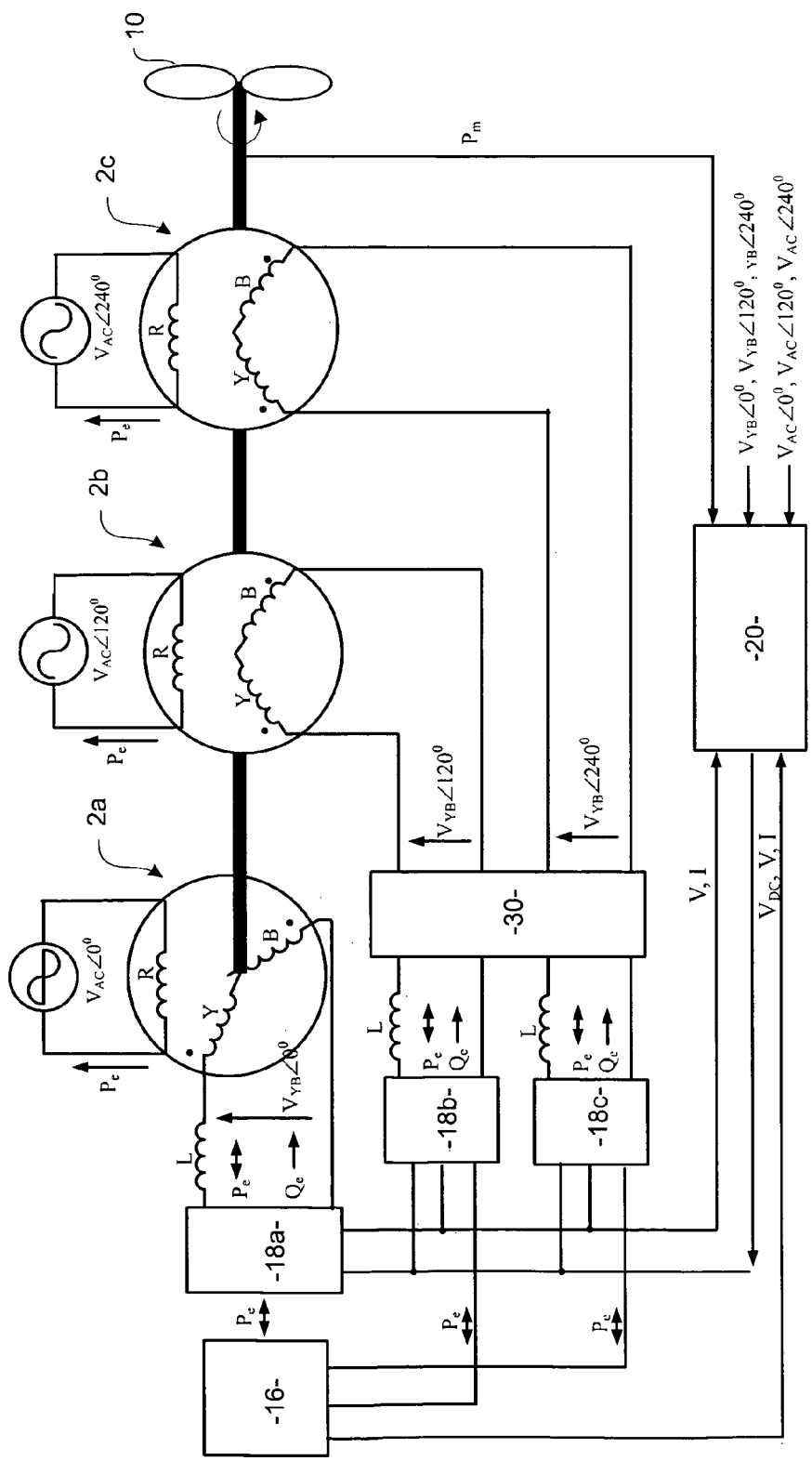
FIG. 7 schematically illustrates a seventh preferred embodiment of the invention, for generation of three phase power.

FIG. 7 shows a further alternative three phase embodiment which is similar to the corresponding single phase embodiment of FIG. 3, in that two stator windings Y and B of each machine 2a-c are excited with an AC voltage $V_{yB}$ and current at the desired output frequency, and the other stator windings R of each machine are connected in series with the load.

Figure 8:
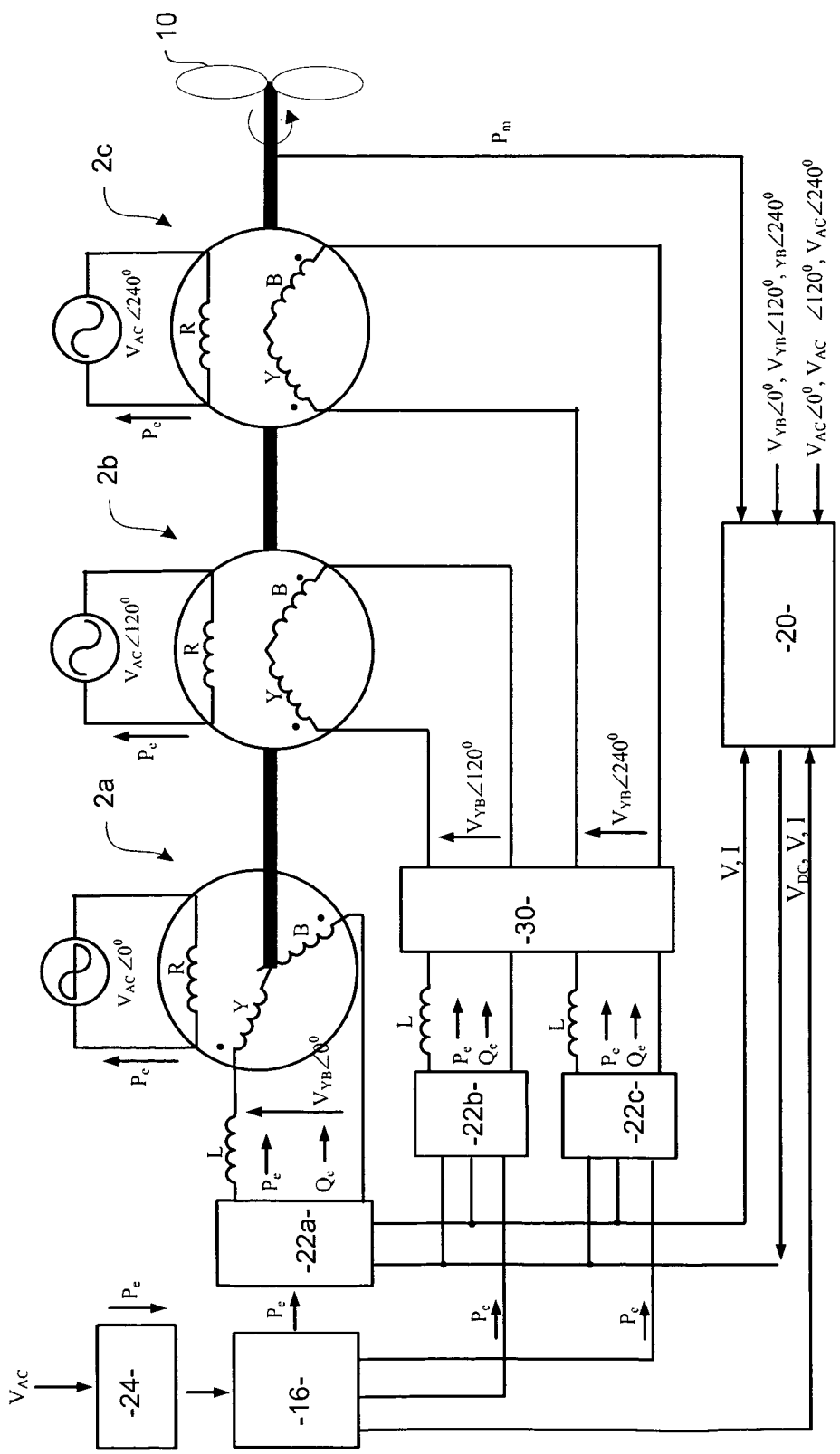
FIG. 8 schematically illustrates an eighth preferred embodiment of the invention, for generation of three phase power.

FIG. 8 shows a further alternative three phase embodiment similar to the corresponding single phase embodiment of FIG. 4 where again two stator windings Y and B are excited and third winding R is connected to the load of each machine 2a to 2c. In this embodiment inverters 22a-c are used to supply AC signal $V_{YB}$ to the stator windings Y and B in these phases (through phase shift and phase lock lap stage 30) for machines 2b and 2c, and a rectifier 24 is used to supply DC current to recharge the battery or capacitor bank 16.

The generator of the invention thus enables a power generator suitable for small to medium scale power generation, at a domestic or small agricultural or industrial scale for example, to be implemented using an economically available three phase induction machine for generation of single phase power, or three such three phase induction machines for generation of three phase power. The generator can be directly connected to the mains grid without requiring a power electronics rectifier and inverter stage to convert the generator output to constant frequency AC. In the preferred form shown excess power is stored in the battery and can be later retrieved.

In the preferred form described above the rotor is a squirrel cage rotor (a rotor comprising iron or other conducting metal laminations). In an alternative form however the rotor may be a wound rotor.

The foregoing describes the invention including a preferred form thereof. Alterations and modifications as will be obvious to those skilled in the art are intended to be incorporated in the scope hereof as defined in the accompanying claims.

The invention claimed is:

1. An electric power generator for generating a substantially constant frequency output from a varying mechanical speed input, comprising a three-phase induction machine with a rotor and a stator, the stator comprising three windings, in which at least a first stator winding is magnetically and electrically decoupled from at least one other stator winding which is arranged to be connected to an external load, and a power source is arranged to excite said first stator winding with an AC current at a desired output frequency.

2. An electric power generator according to claim 1 where the first stator winding is magnetically and electrically decoupled from a second and third stator windings, where the second and third stator windings are connected in series and arranged to be connected to an external load.

3. An electric power generator according to claim 1 where the first stator winding is connected in series with a second stator winding, the first and second stator windings magnetically and electrically decoupled from a third stator winding, where the third stator winding is arranged to be connected to an external load, and a power source is arranged to excite the first and second stator windings with an AC current at a desired output frequency.

4. An electric power generator according to claim 1 wherein the power source comprises an inverter arranged to convert DC power from a battery or capacitor bank to AC power at the output frequency.

5. An electric power generator according to claim 1 wherein the power source comprises a rectifier and battery or capacitor bank arranged to convert an alternating current from the generator to DC for recharging the battery or capacitor bank.

6. An electric power generator according to claim 1 wherein the power source comprises a rectifier-inverter arranged for bi-directional power flow between a battery or capacitor bank and the stator winding(s) for both exciting the stator winding(s) at the output frequency and recharging the battery or capacitor bank.

7. An electric power generator according to of claim 4 including a controller arranged to provide switching signals to the inverter for generating the AC current.

8. An electric power generator according to claim 1 wherein the rotor is a squirrel cage rotor.

9. An electric power generator for generating a substantially constant frequency three phase output from a varying mechanical speed input, comprising three stators or sets of stator windings, each comprising three windings, in which at least one winding of each stator or set of stator windings is magnetically and electrically decoupled from at least one other winding and in which in each stator at least one other winding is arranged to be connected to an external load, and a power source or sources is or are arranged to excite said at least one winding of a first of said stators or sets of stator windings with an AC current at a desired output frequency and with a first phase, said at least one winding of a second stator or sets of stator windings with an AC current at said desired output frequency and with a second phase, and said at least one winding of the third of said stators or sets of stator windings with an AC current at said desired output frequency and with a third phase.

10. An electric power generator according to claim 9 in which one winding of each stator is magnetically and electrically decoupled from two other windings of the stator or set of stator windings which are connected in series and arranged to be connected to an external load, and said power source or sources is or are arranged to excite said one winding of a first stator or set of stator windings with an AC current at a desired output frequency and with a first phase, said one winding of a second stator or set of stator windings with an AC current at said desired output frequency and with a second phase, and said one winding of the third of said stators or set of stator windings with an AC current at said desired output frequency and with a third phase.

11. An electric power generator according to claim 10 in which two windings of each stator or set of stator windings are magnetically and electrically decoupled from a third winding of the stator which is arranged to be connected to an external load, and said power source or sources is or are arranged to excite said two windings of a first stator or set of stator windings with an AC current at a desired output frequency and with a first phase, said two windings of a second stator or set of stator windings with an AC current at said desired output frequency and with a second phase, and said two windings of the third of said stators or set of stator windings with an AC current at said desired output frequency and with a third phase.

12. An electric power generator according to claim 9 wherein said power source(s) comprise one or more AC inverters arranged to convert DC from a battery or capacitor bank to AC at the output frequency and phases.

13. An electric power generator according to claim 9 wherein said power source(s) comprise a rectifier and battery or capacitor bank arranged to convert an alternating current from the generator to DC for recharging the battery or capacitor bank.

14. An electric power generator according to claim 9 wherein said power source(s) comprise one or more rectifier-inverters arranged for bi-directional power flow between a battery or capacitor bank and the stator winding(s) for both exciting the stator winding(s) at the output frequency and recharging the battery or capacitor bank.

15. An electric power generator according to claim 9 including a controller arranged to provide switching signals to the inverter(s) for generating the AC currents.

16. An electric power generator according to claim 9 wherein the rotor is a squirrel cage rotor.

17. A method of generating electric power of substantially constant frequency output from a varying mechanical speed input, comprising rotating the rotor of a three-phase induction machine, exciting at least a first stator winding, which is magnetically and electrically decoupled from at least one other stator winding, with an AC current at a desired output frequency, and taking power from said at least one other stator winding.

18. A method of generating electric power according to claim 17 where the first stator winding is magnetically and electrically decoupled from a second and third stator windings, and where the second and third stator windings are connected in series.

19. A method of generating electric power according to claim 17 where the first and a second stator winding are connected in series and are magnetically and electrically decoupled from a third stator winding.

* * * * *